United States Patent [19]

Gruzensky et al.

[11] 4,388,280

[45] Jun. 14, 1983

[54] EXTRACTION OF ALUMINUM FROM CLAY

[75] Inventors: William G. Gruzensky, Lebanon; Richard S. Olsen, Albany, both of Oreg.

[73] Assignee: The United States of America as represented by the Secretary of the Interior, Washington, D.C.

[21] Appl. No.: 389,307

[22] Filed: Jun. 17, 1982

Related U.S. Application Data

[63] Continuation-in-part of Ser. No. 289,613, Aug. 3, 1981, abandoned.

[51] Int. Cl.³ .............................................. C01F 7/20
[52] U.S. Cl. .................................... 423/131; 423/132
[58] Field of Search ............................... 423/131, 132

[56] References Cited

U.S. PATENT DOCUMENTS

| | | | |
|---|---|---|---|
| 1,942,897 | 1/1934 | Lee | 266/147 |
| 2,010,844 | 8/1935 | Bucher | 423/132 |
| 2,531,978 | 11/1950 | Hammaren et al. | 423/132 |
| 3,240,562 | 3/1966 | Brown et al. | 423/132 |
| 4,246,239 | 1/1981 | Dewey et al. | 423/132 |

Primary Examiner—Herbert T. Carter
Attorney, Agent, or Firm—William S. Brown; Donald A. Gardiner

[57] ABSTRACT

A process for recovery of aluminum from clay comprising treating the crushed clay with water in the form of a fine mist, and in an amount sufficient to form compact surfaces on the particles without agglomeration thereof, and subsequently drying the misted clay to cause the particles to shrink and harden, and calcining and leaching with a mineral acid to extract aluminum from the clay.

4 Claims, No Drawings

EXTRACTION OF ALUMINUM FROM CLAY

This application is a continuation-in-part of application Ser. No. 289,613, filed Aug. 3, 1981 and now abandoned.

This invention relates to an improvement in extraction of aluminum from clays, particularly kaolin clays, by means of mineral acids.

Extraction of aluminum from clays by means of acids, such as hydrochloric, sulfuric, or nitric acids, is well known. Generally, the clay is initially ground, and then calcined at temperatures of about 650° to 850° C., followed by leaching with about 6 to 10 normal solutions of acid at ambient pressure and boiling temperature. Aluminum is thus readily leached from the clay. However, the leached residues are difficult to separate from pregnant solutions because of the presence of slimes resulting from submicron-size clay dusts on the surfaces of the ground clay particles.

Prior art attempts to overcome this problem have generally involved formation of pellets by agglomeration of the ground clay. For example, U.S. Pat. No. 4,246,239 discloses formation of pellets by mulling the clay, extruding it and then recompacting the pellets by rolling them in a rotating drum for 30 minutes or more. Such processes, however, involve relatively complicated and time-consuming procedures. Moreover, the pellets formed thereby still tend to produce slimy residues, apparently due to scrubbing and attrition of large particles on reactor walls and breakup of poorly formed agglomerates.

It has now been found, according to the present invention, that these problems may be largely overcome by means of a process in which the raw clay, after initial crushing to a suitable particle size, is treated with water in the form of a fine mist and in an amount sufficient to form a dense, smooth surface on the individual particles but not sufficient to cause agglomeration of these particles. However, submicron-size dusts are thereby agglomerated on the surfaces of the larger particles. The misted clay is then dried at a temperature, and for a time, sufficient to cause the particles to shrink and harden. In addition, the drying causes the fine, submicron-size clay dusts to become firmly attached to the surfaces of the larger clay particles. This combination of misting and drying steps results in a feed material that is readily calcined and leached according to conventional procedures, with minimum formation of slimes in the leaching process, as illustrated in the examples below.

In the process of the invention, the raw clay is initially crushed to a particle size suitable for leaching. This will generally be a particle size ranging from about minus 20-mesh to about minus 14-mesh. Optimum particle size will depend on the specific clay, subsequent drying and calcing conditions, and specific leach solution employed, and is best determined experimentally. As mentioned above, the resulting particles are characterized by the presence of submicron-size dusts on their surfaces.

The crushed clay is then subjected to agitation in the presence of water in the form of a fine mist in order to consolidate the submicron-size dusts and form a dense, compacted surface on the individual clay particles. The amount of water thus employed is, however, limited to that necessary to thoroughly moisten the particle surfaces, without causing agglomeration of the clay particles into larger aggregates. Again, the optimum amount of water will depend on the specific type of clay, as well as particle size and water content of the crushed clay and leaching process steps, and is best determined experimentally. Generally, however, for a kaolin clay, the resultant water content of the clay particles will be about 18 to 20 percent.

Agitation of the crushed clay during misting may be by any conventional means insuring adequate contact of mist with the particle surfaces. A particularly preferred means has been found to consist of tumbling of the crushed clay on an inclined rotating disk, while simultaneously applying the mist. The mist is also formed by conventional means such as airless or air atomizing spray nozzles, and preferably consists of water particles about 10 to 40 microns in diameter.

The misted clay is then dried at a temperature, and for a time, sufficient to cause the particles to shrink and harden, as well as causing the submicron-size dusts to become firmly attached to the surface of the larger particles, as discussed above. Drying may be done in ovens, travelling belt driers, rotary kilns, fluidized beds, or other conventional means. The optimum temperature and time of drying will depend on the specific method employed for drying, and is also best determined experimentally. For example, good results have been obtained by drying the misted clay in pans at a temperature of about 130° C. for a period of about 24 hours, in a rotary kiln at a temperature of 275° C. for a period of 157 minutes, and on a travelling belt at a temperature of about 325° C. for a period of about 1 hour. Generally, a temperature range of about 100° to 350° C., with corresponding drying times of 24 hours to 1 hour, are satisfactory.

The dried clay is then calcined, in conventional manner, at about 650° to 850° C., preferably at about 750° C., for a period of about 30 to 120 minutes. Calcining, which is suitably done in a fluidized bed or rotary kiln, renders the aluminum acid-soluble and further hardens the surface of the clay particles.

The calcined product is then leached in conventional manner with mineral acids to extract aluminum from the clay. Particles of the calcined product are small enough to stay suspended in leach solution in a stirred tank, or other suitable reaction vessel, with gentle stirring or other agitation. At the same time, the calcined product is free of slime-forming submicron-size fines that make settling and filtration difficult. As a result, leaching, and separation of residue from pregnant leach liquors, is readily accomplished without significant slime formation.

The invention will be more specifically illustrated by the following examples.

EXAMPLE 1

As-mined kaolinitic clay containing 19.3 wt-pct water was crushed to a particle size of minus 14-mesh. The sized clay, containing about 18.5 pct water, was then dampened by application of a fine mist of water while tumbling the clay on an inclined, rotating disk. The mist was formed by means of an air atomizing spray nozzle, and was directed at the clay by spraying into the central area of the rotating disk which was tilted at an angle of about 40° from the vertical. The rotating disk consisted of a circular base with 4¾ inch sides, with a diameter of 38 inches. Rotational speed of the disk was 16 rpm. Application of about 2 ml of water/kilogram of clay resulted in the clay particles being thoroughly wetted and their surfaces being slicked down and smoothed.

Also, any submicron-size dusts were agglomerated on the surface of the larger clay particles, without aggregation or agglomeration of the larger particles.

The misted clay, containing about 19.7 pct water, was dried in pans for 24 hours at 130° C., causing the particles to shrink and harden. The dried clay was then calcined in a fluidized bed at 750° C. for at least 60 minutes, causing further hardening of the surfaces of the clay particles, as well as rendering the aluminum acid-soluble. Scanning electron photomicrographs of the misted, as well as unmisted, calcined products were made, with the misted particles showing a dense compacted surface. By contrast, the unmisted particles showed a fuzzy surface coated with submicron-size clay dust.

In addition, fines elutriated from the fluidized bed calciner were collected in a cyclone separator to determine the dust losses which amounted to 1.7 pct of the calcined clay product, as shown in Table 1, below. The bulk density of the calcined clay was also determined and found to be 0.99 g/cm$^3$.

The calcined clay was leached in 23 pct HCl in 5 pct stoichiometric excess, and the settling rate of the leached slurry was determined at 50° C. A sample was placed in a graduated cylinder, 6 ppm of a nonionic high molecular weight liquid flocculant (Nalco 7871) was added, and the mixture gently shaken to suspend the solids. The solids settling rate was then observed. A settling rate of 16.2 cm/min was obtained in the 50° C. aluminum chloride liquor (around 50 gpl Al).

Permeability of the leached residue was obtained by shaking the settling rate sample to remix it and pouring the slurry onto a Buchner funnel and flushing with water. The filter cake was washed and its permeability determined by observing the rate water passed through the cake. Permeability for the residue was $11.2 \times 10^{-8}$ cm$^2$.

EXAMPLE 2

The procedure of this example was essentially the same as that of Example 1, except that the drying step was omitted. Results are again given in Table 1. As will be seen, omission of the drying step resulted in a much larger proportion of fines (10.8 pct vs 1.7 pct), i.e., substantially greater dust losses. In addition, the settling rate of the leached slurry (4.0 cm/min) was much lower than that obtained with the combined misting and drying steps of Example 1 (16.2 cm/min).

EXAMPLE 3

The procedure of this example was also essentially the same as that of Example 1, except that the misting step was omitted. Results are again shown in Table 1. It will be seen that omission of the misting step resulted in substantially greater dust losses (5.7 pct fines as compared to 1.7 pct fines in Example 1), as well as some decrease in settling rate.

TABLE 1

| Example | Clay treatment | | Product properties | | | |
|---|---|---|---|---|---|---|
| | Misted | Dried | Fines, pct | Density, g/cm$^3$ | Settling rate, cm/min | Permeability, cm$^2$ |
| 1 | Yes | Yes | 1.7 | 0.99 | 16.2 | $11.2 \times 10^{-8}$ |
| 2 | Yes | No | 10.8 | .95 | 4.0 | $11.1 \times 10^{-8}$ |
| 3 | No | Yes | 5.7 | .99 | 14.3 | $5.8 \times 10^{-8}$ |

It is apparent from the above examples, as shown by the data of Table 1, that the combination of the misting and drying steps of the invention is essential to achievement of optimum results in extraction of aluminum from clay, particularly as regards separation of leached residues from pregnant solutions without formation of slimes.

We claim:
1. A process for recovery of aluminum from raw kaolinitic clay comprising:
   crushing the clay to a particle size of about minus 14-mesh;
   subjecting the crushed clay to agitation in the presence of water in the form of a fine mist, the amount of water being sufficient to form a dense, compacted surface on the individual particles, but not sufficient to cause agglomeration of the particles, whereby any submicron-size dusts are agglomerated on the surfaces of the larger clay particles;
   drying the thus-treated clay at a temperature of about 100° to 350° C. and for a time of about 24 hours to 1 hour to cause the particles to shrink and harden, and to cause submicron-size dusts to become firmly attached to the surfaces of the larger clay particles;
   calcining the dried clay; and
   subjecting the calcined product to treatment with an acidic leach solution, whereby aluminum is leached from the clay.
2. The process of claim 1 in which the raw clay is initially crushed to a particle size of minus 20-mesh.
3. The process of claim 1 in which the agitation of the crushed clay is by means of an inclined rotating disk.
4. The process of claim 1 in which the water content of the misted clay particles is about 18 to 20 percent.

* * * * *